United States Patent
Zhao et al.

(10) Patent No.: US 11,825,072 B2
(45) Date of Patent: Nov. 21, 2023

(54) METHOD AND DEVICE FOR MPM LIST GENERATION FOR MULTI-LINE INTRA PREDICTION

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/886,595

(22) Filed: Aug. 12, 2022

(65) Prior Publication Data
US 2022/0394238 A1    Dec. 8, 2022

Related U.S. Application Data

(63) Continuation of application No. 16/986,815, filed on Aug. 6, 2020, now Pat. No. 11,451,769, which is a
(Continued)

(51) Int. Cl.
*H04N 19/103*        (2014.01)
*H04N 19/44*         (2014.01)
(Continued)

(52) U.S. Cl.
CPC ......... *H04N 19/103* (2014.11); *H04N 19/159* (2014.11); *H04N 19/176* (2014.11); *H04N 19/44* (2014.11)

(58) Field of Classification Search
CPC .... H04N 19/103; H04N 19/105; H04N 19/11; H04N 19/159; H04N 19/176;
(Continued)

(56) References Cited

U.S. PATENT DOCUMENTS

2013/0243087 A1    9/2013    Lee et al.
2014/0219342 A1    8/2014    Yu et al.
(Continued)

FOREIGN PATENT DOCUMENTS

EP    3422716 A1 *    1/2019    ............ H04N 19/11

OTHER PUBLICATIONS

Liang Zhao et al., "CE3-related: MPM based multi-line intra prediction scheme", Joint Video Exploration Team (JVET) of ITU-T SG 16 WP 3 and ISO/IEC JTC 1/SC 29/WG 11, JVET-K0482_r1, Jul. 10-18, 2018 (3 pages total).
(Continued)

*Primary Examiner* — Maria E Vazquez Colon
(74) *Attorney, Agent, or Firm* — Sughrue Mion, PLLC

(57) ABSTRACT

A method of and device for controlling multi-line intra prediction using a non-zero reference line. The method includes determining whether an intra prediction mode of a first neighboring block of a current block is an angular mode, determining whether an intra prediction mode of a second neighboring block of the current block is an angular mode, and generating a Most Probable Mode (MPM) list of the current block.

20 Claims, 9 Drawing Sheets

Related U.S. Application Data continuation of application No. 16/234,993, filed on Dec. 28, 2018, now Pat. No. 10,771,778.

(60) Provisional application No. 62/731,776, filed on Sep. 14, 2018.

(51) Int. Cl.
    *H04N 19/176*     (2014.01)
    *H04N 19/159*     (2014.01)

(58) Field of Classification Search
    CPC .... H04N 19/423; H04N 19/44; H04N 19/463; H04N 19/593
See application file for complete search history.

(56) References Cited

U.S. PATENT DOCUMENTS

| | | |
|---|---|---|
| 2017/0332084 A1 | 11/2017 | Seregin et al. |
| 2018/0098064 A1 | 4/2018 | Seregin et al. |
| 2018/0205946 A1 | 7/2018 | Zhang et al. |
| 2019/0104303 A1 | 4/2019 | Xiu et al. |
| 2019/0238841 A1* | 8/2019 | Lee .................... H04N 19/46 |
| 2019/0320204 A1 | 10/2019 | Chiang et al. |
| 2019/0364273 A1 | 11/2019 | Zhao et al. |
| 2020/0021804 A1 | 1/2020 | Jun et al. |
| 2021/0344929 A1* | 11/2021 | Choi .................... H04N 19/157 |

OTHER PUBLICATIONS

Office Action dated Nov. 30, 2022 from the Korean Intellectual Property Office in KR Application No. 10-2020-7031910.
Benjamin Bross et al., "Versatile Video Coding (Draft 2)", JVET of ITU-T SG 16 WP 3 and ISO/IEC JTC 1/SC29/WG11, 11th Meeting: Ljubljana, SI, Jul. 10-18, 2018, JVET-K1001-v7 (139 pages total).
Benjamin Bross et al., "Versatile Video Coding (Draft 3)", JVET of ITU-T SG 16 WP3 and ISO/IEC JTC 1/SC 29/WG11, 12th Meeting: Macao, CN, Oct. 3-12, 2018, JVET-L1001-v6 (203 pages total).
Extended European Search Report dated May 13, 2022 in Application No. 19859197.6.
International Search Report issued in International Application No. PCT/US 19/48704; filing date Aug. 29, 2019; dated Nov. 18, 2019.
Liang Zhao et al., "CE3-related: MPM based multi-line intra prediction scheme", Joint Video Exploration Team (JVET) of ITU-T SG 16 WP 3 and ISO/IEC JTC 1/SC 29/WG 11, 2018, pp. 1-6 (6 pages total).
Notice of Reasons for Refusal dated Nov. 2, 2021 from the Japanese Patent Office in Japanese Application No. 2020-560454.
Written Opinion of the International Searching Authority dated Nov. 18, 2019 in International Application No. PCT/US19/48704.
Yao-Jen Chang et al., "Improved Intra Prediction Method Based on Arbitrary Reference Tier Coding Schemes", 2016 Picture Coding Symposium (PCS), IEEE, Dec. 4, 2016, pp. 1-5 (5 pages total).
Yi-Wen Chen et al., "Description of SDR, HDR and 360° video coding technology proposal by Qualcomm and Technicolor—low and high complexity versions", Joint Video Exploration Team (JVET) of ITU-T SG 16 WP 3 and ISO/IEC JTC 1/SC 29/WG 11, 2018, pp. 1-6 (6 pages total).
Seregin et al. ("Neighbor based intra most probable modes list derivation", Joint Video Exploration Team (JVET) of ITU-T SG 16 WP 3 and ISO/IEC JTC 1/SC 29/WG 11; 3rd Meeting: Geneva, OH, May 26-Jun. 1, 2016; Document: JVET-C0055) (Year: 2016).
Sullivan et al. ("Meeting Report of the 10th meeting of the Joint Video Experts Team (JVET), San Diego, US, Apr. 10-20, 2018", Joint Video Experts Team (JVET) of ITU-T SG 16 WP 3 and ISO/IEC JTC 1/SC 29/WG 11; 10th Meeting: San Diego, US Apr. 10-20, 2018; Document: JVET-J Notes d0) (Year: 2018).
Chen et al. ("Description of SDR, HDR and 360° video coding technology proposal by Qualcomm and Technicolor—low and high complexity versions"; Joint Video Exploration Team (JVET) of ITU-T SG 16 WP 3 and ISO/IEC JTC 1/SC 29/WG 11; 10th Meeting: San Diego, US Apr. 10-20, 2018; Document: JVET-J0021) (Year: 2018).

* cited by examiner

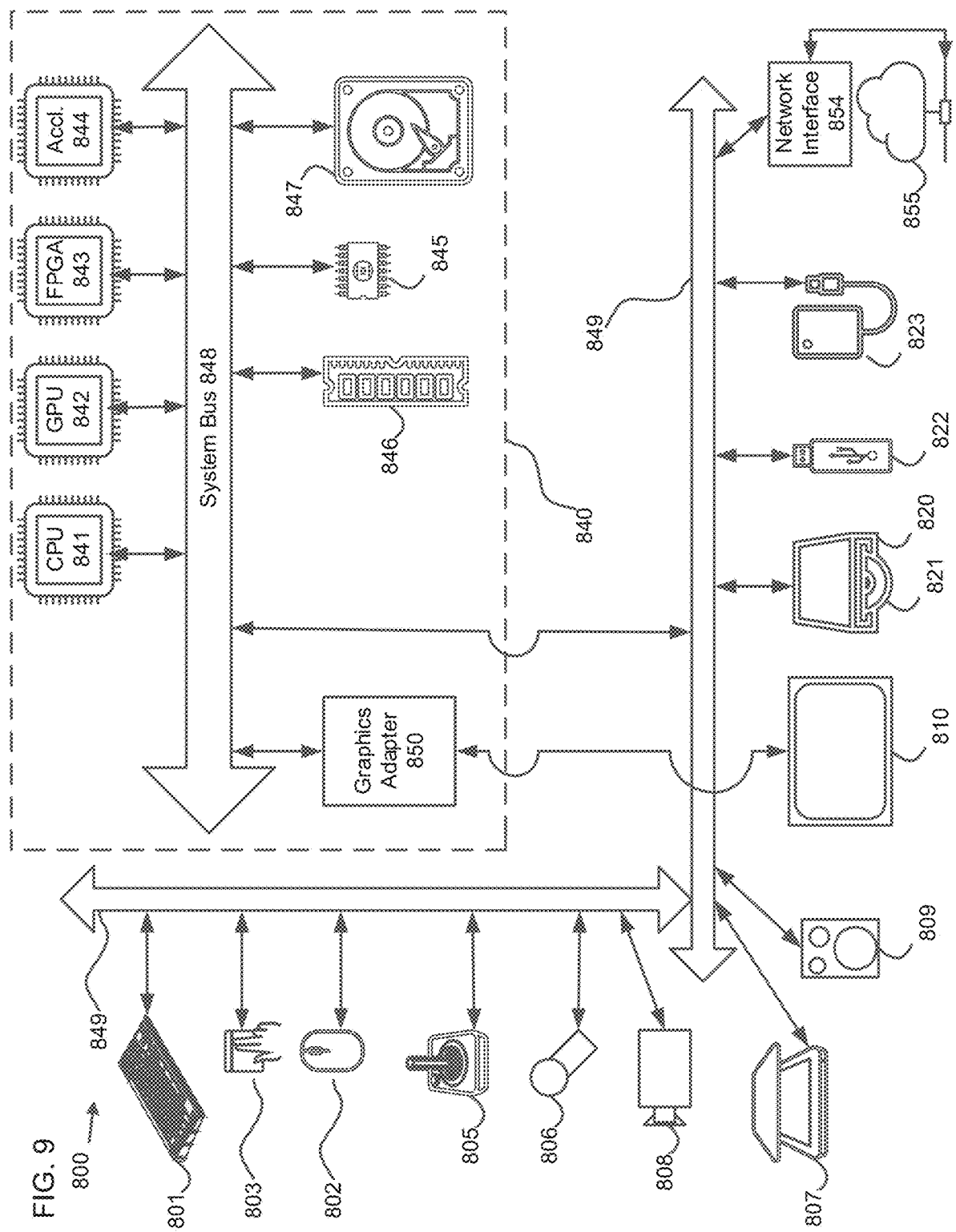

METHOD AND DEVICE FOR MPM LIST GENERATION FOR MULTI-LINE INTRA PREDICTION

CROSS-REFERENCE TO RELATED APPLICATIONS

This application is a Continuation of U.S. application Ser. No. 16/986,815, filed on Aug. 6, 2020, which is a Continuation of U.S. application Ser. No. 16/234,993, filed on Dec. 28, 2018, now U.S. Pat. No. 10,771,778, patented on Sep. 8, 2020, which claims priority from U.S. Provisional Application No. 62/731,776, filed on Sep. 14, 2018, the disclosures of which are incorporated herein by reference in their entireties.

FIELD

This disclosure is directed to a set of advanced video coding technologies. More specifically, an MPM list generation scheme for multi-line intra prediction.

BACKGROUND

The intra prediction modes used in High Efficiency Video Coding (HEVC) are illustrated in FIG. 5. In HEVC, there are total 35 intra prediction modes, among which mode 10 is horizontal mode (501), mode 26 is vertical mode (502), and mode 2, mode 18, and mode 34 are diagonal modes (503). The intra prediction modes are signalled by three most probable modes (MPMs) and 32 remaining modes.

To code an intra mode, a most probable mode (MPM) list of size 3 is built based on the intra modes of the neighboring blocks. This MPM list will be referred to as the MPM list or primary MPM list. If the intra mode is not from the MPM list, a flag is signalled to indicate whether the intra mode belongs to the selected modes.

A process of generating the MPM list is shown as follows. Here, leftIntraDir indicates a mode in a left block and aboveIntraDir indicates a mode in an above block. If the left or above block is currently not available, leftIntraDir or aboveIntraDir is set to an index DC_IDX. In addition, variables "offset" and "mod" are constant values, which are set to 29 and 32, respectively.

```
If      (leftIntraDir==aboveIntraDir      &&
  leftIntraDir>DC_IDX)
  MPM [0]=leftIntraDir;
  MPM [1]=((leftIntraDir+offset) % mod)+2;
  MPM [2]=((leftIntraDir−1) % mod)+2;
Else if (leftIntraDir==aboveIntraDir)
  MPM [0]=PLANAR_IDX;
  MPM [1]=DC_IDX;
  MPM [2]=VER_IDX;
Else if (leftIntraDir !=aboveIntraDir)
  MPM [0]=leftIntraDir;
  MPM [1]=aboveIntraDir;
  If (leftIntraDir>0 && aboveIntraDir>0)
    MPM [2]=PLANAR_IDX;
  Else
    MPM    [2]=(leftIntraDir+aboveIntraDir)<2
      ?  VER_IDX: DC_IDX;
```

SUMMARY

According to one or more embodiments, a video decoding method performed by at least one processor to control multi-line intra prediction using a non-zero reference line is provided. The method includes: determining whether an intra prediction mode of a first neighboring block of a current block is an angular mode; determining whether an intra prediction mode of a second neighboring block of the current block is an angular mode; and generating a Most Probable Mode (MPM) list for intra prediction of the current block. The generating includes: determining the intra prediction mode of the first neighboring block is an angular mode and the intra prediction mode of the second neighboring block is not an angular mode; and including in the MPM list, based on the determining, the intra prediction mode of the first neighboring block, a left adjacent angular mode of the intra prediction mode of the first neighboring block, a right adjacent angular mode of the intra prediction mode of the first neighboring block, an adjacent angular mode of the left adjacent angular mode other than the intra prediction mode of the first neighboring block, an adjacent angular mode of the right adjacent angular mode other than the intra prediction mode of the first neighboring block, and an additional adjacent angular mode that is adjacent to the adjacent angular mode of the left adjacent angular mode other than the left adjacent angular mode or that is adjacent to the adjacent angular mode of the right adjacent angular mode other than the right adjacent angular mode.

According to one or more embodiments, a device for controlling multi-line intra prediction using a non-zero reference line for decoding a video sequence is provided. The device includes: at least one memory configured to store computer program code; and at least one processor configured to access the at least one memory and operate according to the computer program code. The computer program code includes: first determining code configured to cause the at least one processor to determine whether an intra prediction mode of a first neighboring block of a current block is an angular mode; second determining code configured to cause the at least one processor to determine whether an intra prediction mode of a second neighboring block of the current block is an angular mode; and generating code configured to cause the at least one processor to generate a Most Probable Mode (MPM) list for intra prediction of the current block. The generating code includes code configured to cause the at least one processor to: include in the MPM list, based on determining the intra prediction mode of the first neighboring block is an angular mode and the intra prediction mode of the second neighboring block is not an angular mode, the intra prediction mode of the first neighboring block, a left adjacent angular mode of the intra prediction mode of the first neighboring block, a right adjacent angular mode of the intra prediction mode of the first neighboring block, an adjacent angular mode of the left adjacent angular mode other than the intra prediction mode of the first neighboring block, an adjacent angular mode of the right adjacent angular mode other than the intra prediction mode of the first neighboring block, and an additional adjacent angular mode that is adjacent to the adjacent angular mode of the left adjacent angular mode other than the left adjacent angular mode or that is adjacent to the adjacent angular mode of the right adjacent angular mode other than the right adjacent angular mode.

According to one or more embodiments, a non-transitory computer-readable storage medium storing instructions is provided. The instructions cause at least one processor to: determine whether an intra prediction mode of a first neighboring block of a current block is an angular mode; determine whether an intra prediction mode of a second neighboring block of the current block is an angular mode; and generate a Most Probable Mode (MPM) list for intra prediction of the current block. The generating includes: determining the intra prediction mode of the first neighboring block is an angular mode and the intra prediction mode of the second neighboring block is not an angular mode; and including in the MPM list, based on the determining, the intra prediction mode of the first neighboring block, a left adjacent angular mode of the intra prediction mode of the first neighboring block, a right adjacent angular mode of the intra prediction mode of the first neighboring block, an adjacent angular mode of the left adjacent angular mode other than the intra prediction mode of the first neighboring block, an adjacent angular mode of the right adjacent angular mode other than the intra prediction mode of the first neighboring block, and an additional adjacent angular mode that is adjacent to the adjacent angular mode of the left adjacent angular mode other than the left adjacent angular mode or that is adjacent to the adjacent angular mode of the right adjacent angular mode other than the right adjacent angular mode.

BRIEF DESCRIPTION OF THE DRAWINGS

Further features, the nature, and various advantages of the disclosed subject matter will be more apparent from the following detailed description and the accompanying drawings in which:

FIG. 9 is a diagram of a computer system suitable for implementing embodiments.

DETAILED DESCRIPTION

Figure 1:
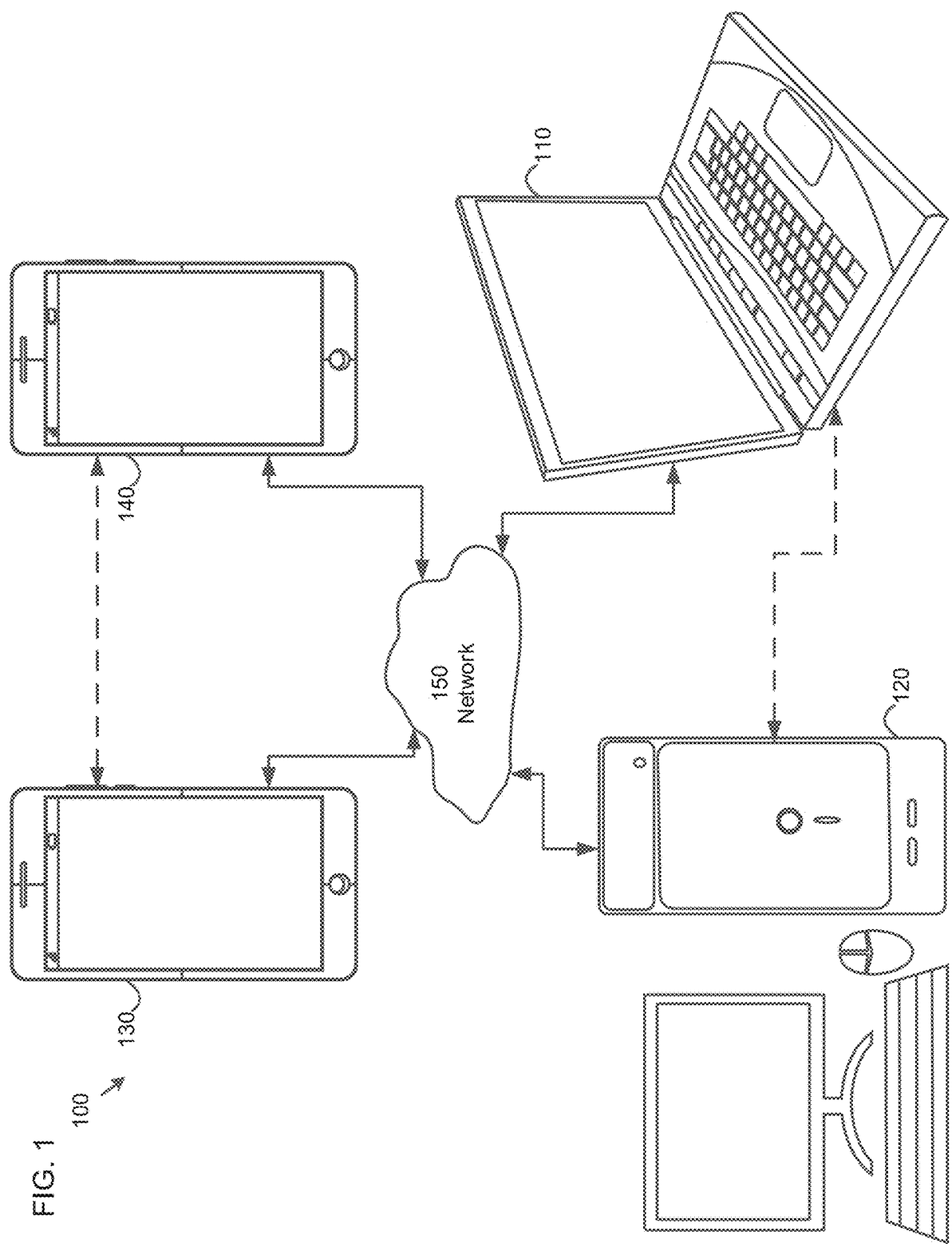
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be, for example, servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140) including, for example, wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
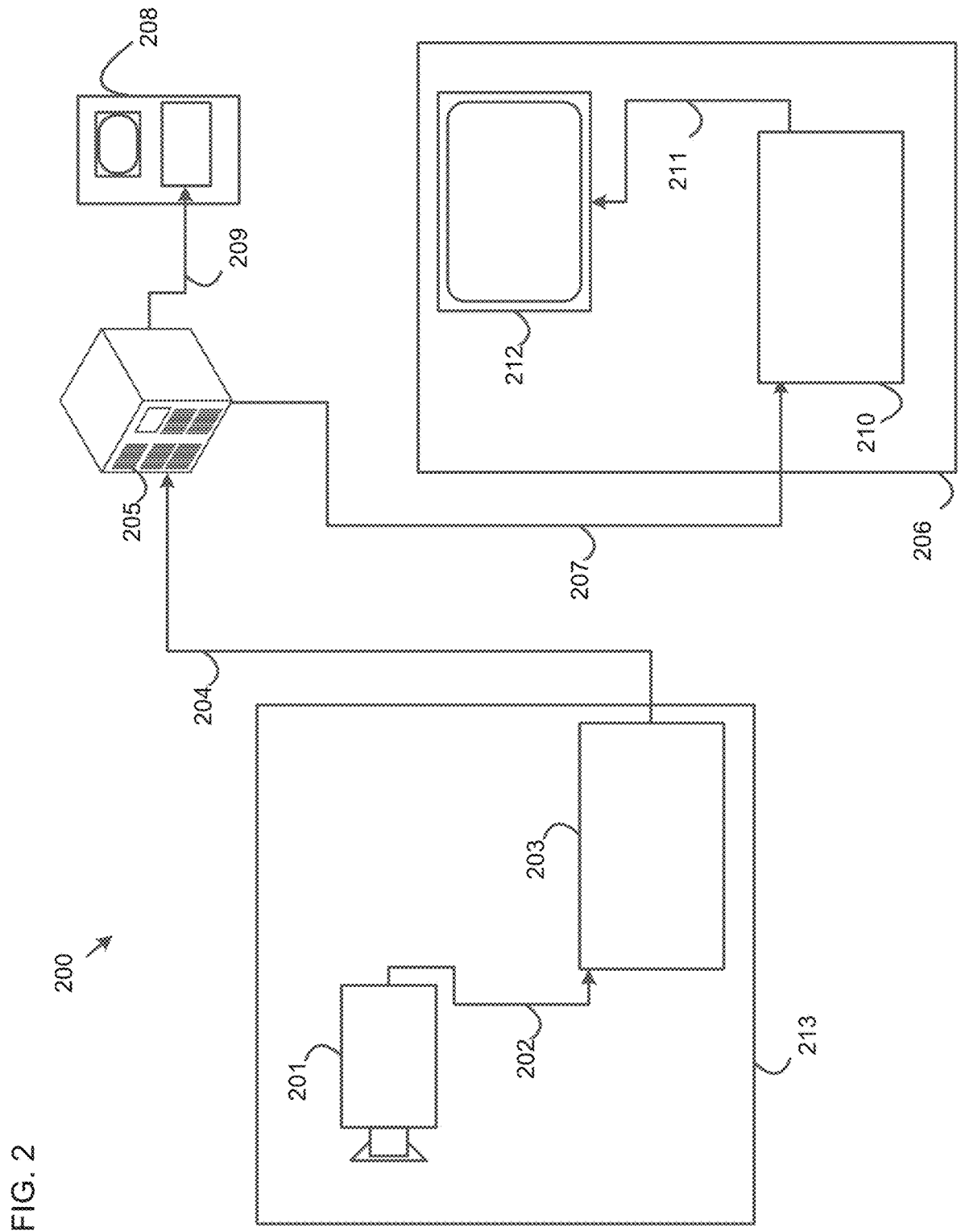
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system (200) may include a capture subsystem (213), that includes a video source (201) and an encoder (203). The streaming system (200) may further include at least one streaming server (205) and/or at least one streaming client (206).

The video source (201) can create, for example, an uncompressed video sample stream (202). The video source (201) may be, for example, a digital camera. The sample stream (202), depicted as a bold line to emphasize a high data volume when compared to encoded video bitstreams, can be processed by the encoder (203) coupled to the camera (201). The encoder (203) can include hardware, software, or a combination thereof to enable or implement aspects of the disclosed subject matter as described in more detail below. The encoder (203) may also generate an encoded video bitstream (204). The encoded video bitstream (204), depicted as a thin line to emphasize a lower data volume when compared to the uncompressed video sample stream (202), can be stored on a streaming server (205) for future use. One or more streaming clients (206) can access the streaming server (205) to retrieve video bit streams (209) that may be copies of the encoded video bitstream (204).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
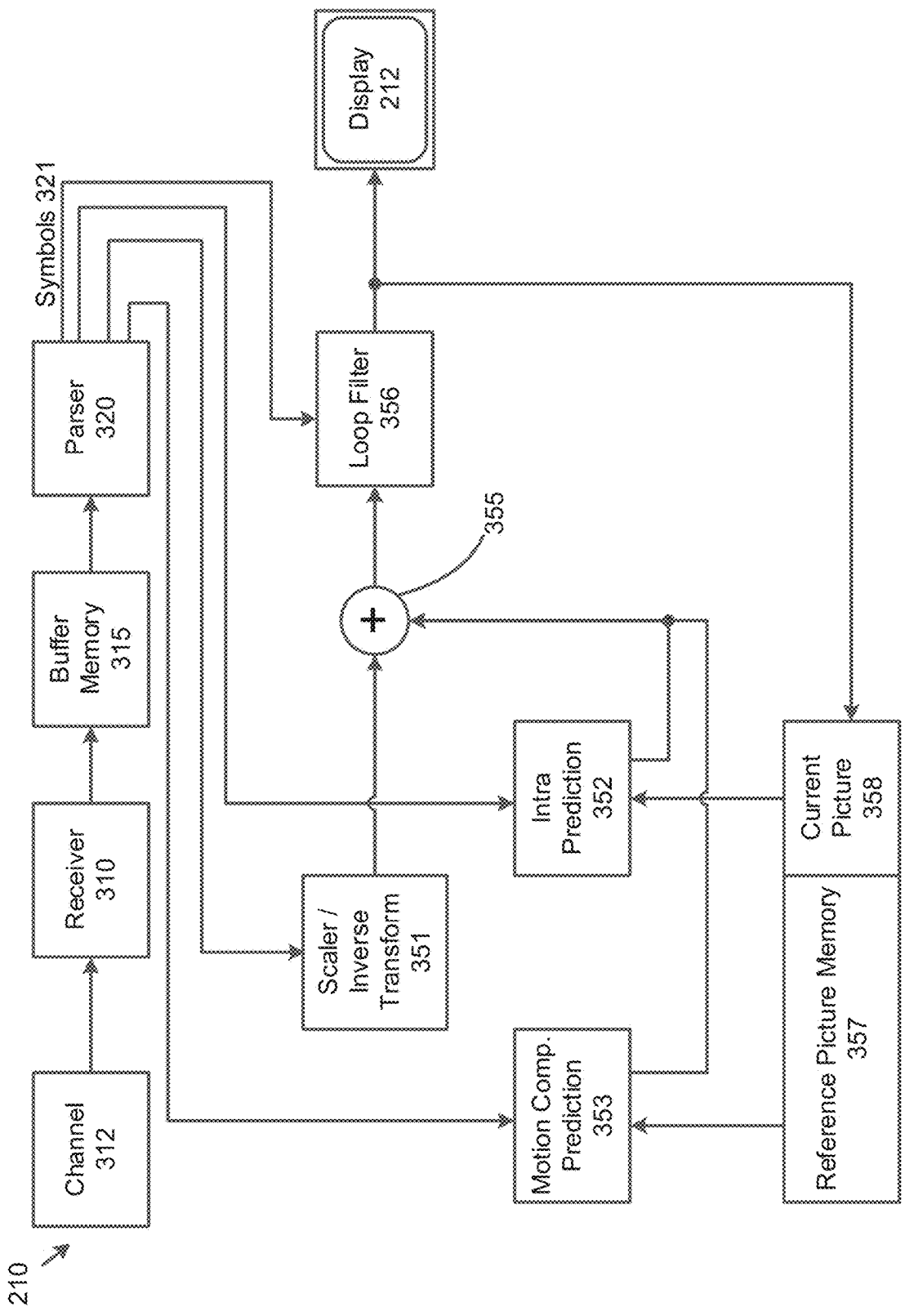
FIG. 3 is a schematic illustration of a simplified block diagram of a video decoder and a display in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory (358). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosychronous network, the buffer (315) may not be used, or can be small. For use on best effort packet networks such as the Internet, the buffer (315) may be required, can be comparatively large, and can be of adaptive size.

The video decoder (210) may include the parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involced, can be controlled by the subgroup control information that was parsed from the coded video sequence by the parser (320). The flow of such subgroup control information between the parser (320) and the multiple units described below is not depicted for clarity.

Beyond the functional blocks already mentioned, the decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks comprising sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by the intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access the reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from where the Motion Compensation Prediction unit (353) fetches prediction samples, can be controlled by motion vectors. The motion vectors may be available to the Motion Compensation Prediction unit (353) in the form of symbols (321) that can have, for example x, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture stored in the current picture memory (358) can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
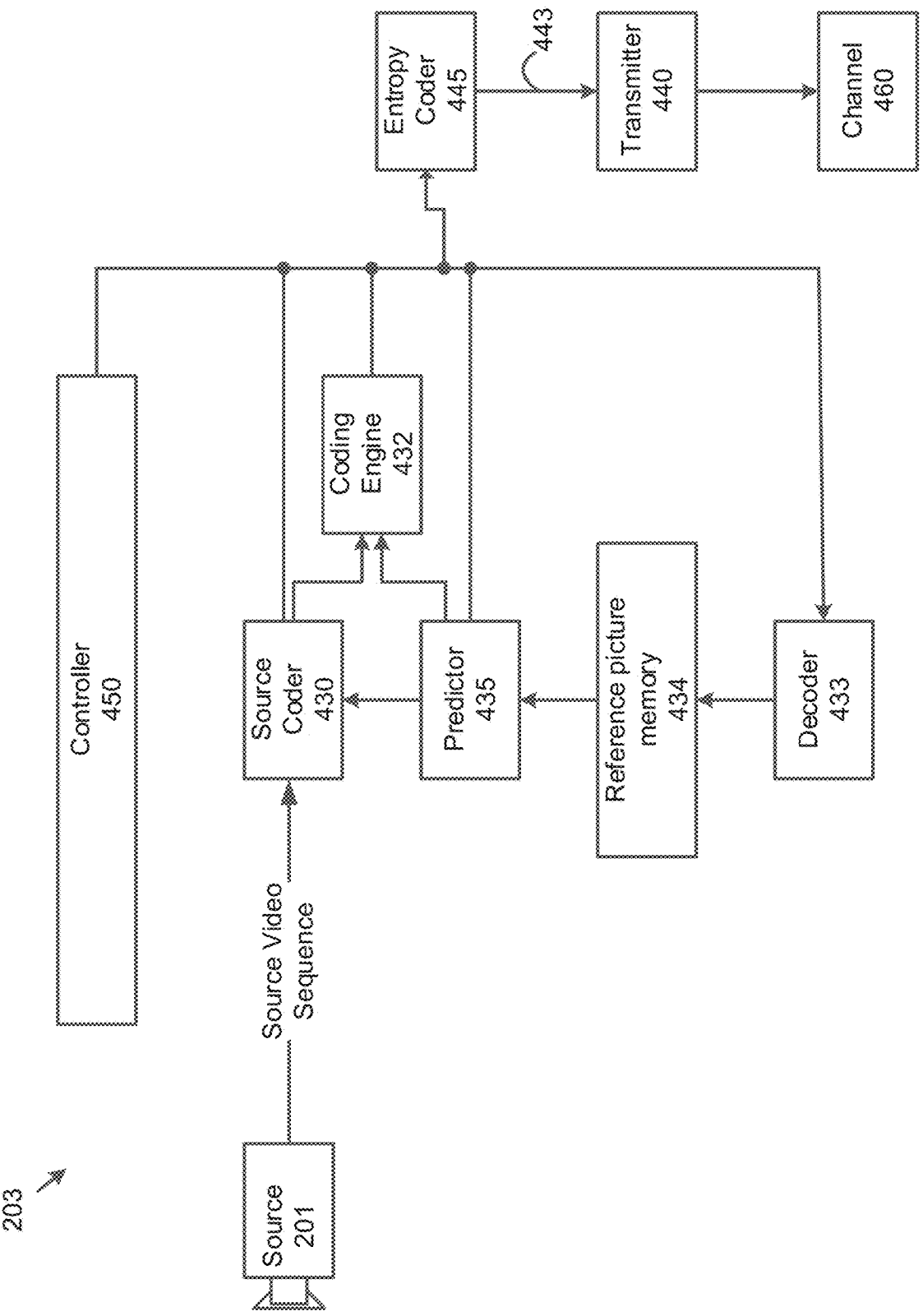
FIG. 4 is a schematic illustration of a simplified block diagram of a video encoder and a video source in accordance with an embodiment.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: x bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed may be one function of the controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As a simplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create, when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be substantially the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data is decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 6:
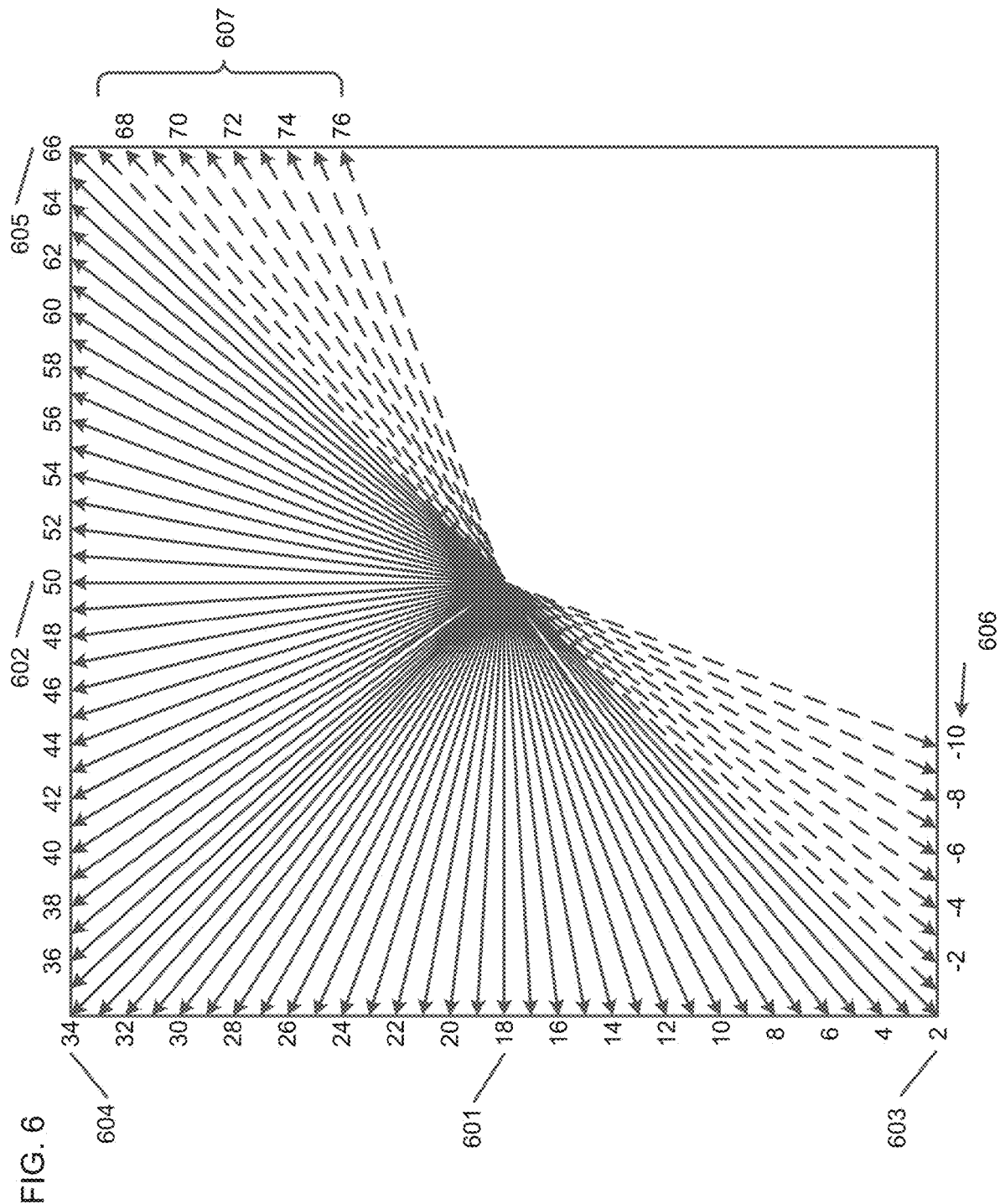
FIG. 6 is a diagram of intra prediction modes in Versatile Video Coding (VVC) Draft 2.

FIG. 6 is a diagram of intra prediction modes in VVC Draft 2.

Figure 5:
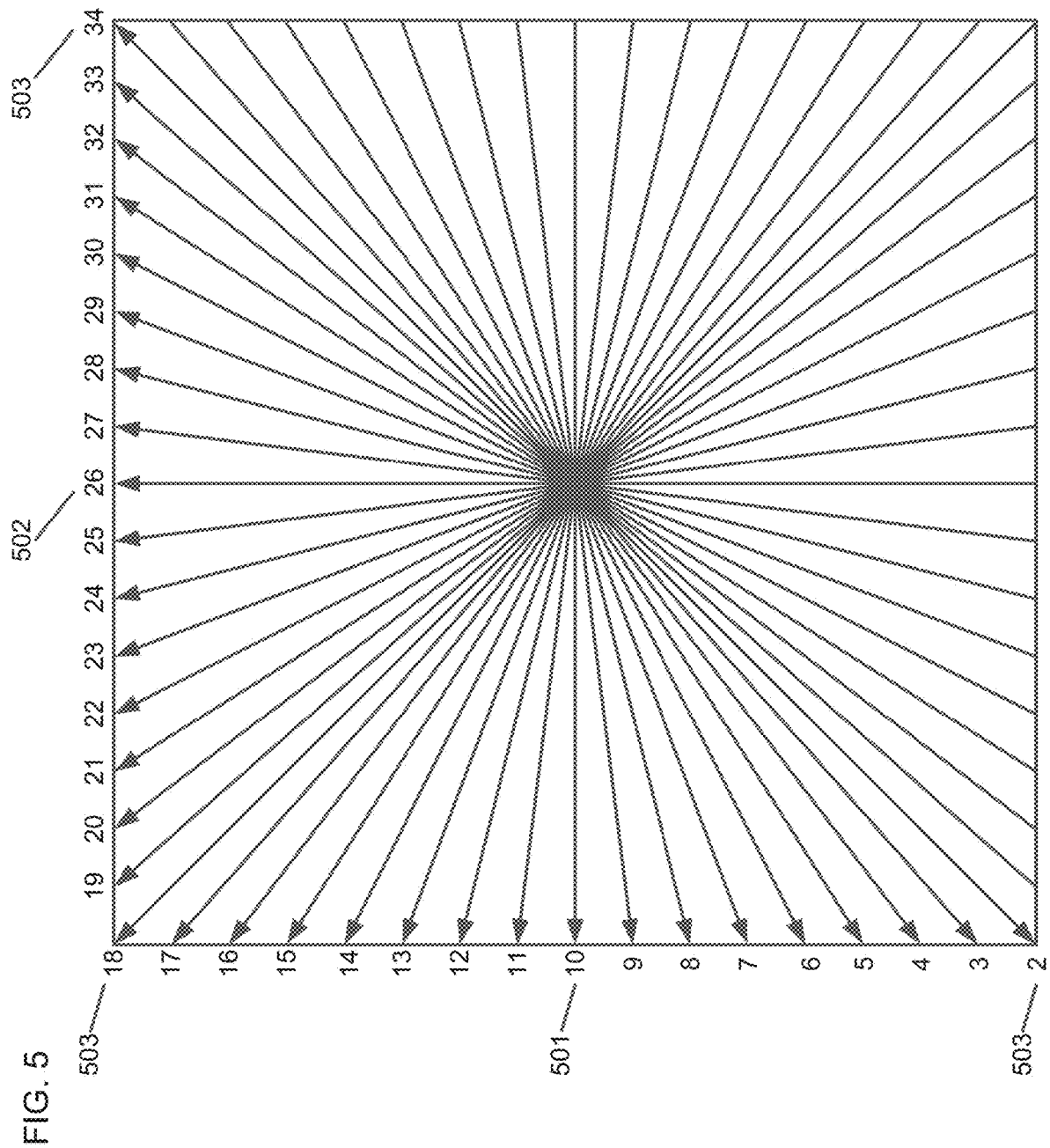
FIG. 5 is a diagram of intra prediction modes in HEVC.

In VVC Draft 2, there is a total of 87 intra prediction modes as shown in FIG. 5, among which mode 18 (601) is a horizontal mode, mode 50 (602) is a vertical mode, and mode 2 (603), mode 34 (604), and mode 66 (605) are diagonal modes. Modes −1 to −10 and modes 67 to 76 are called Wide-Angle Intra Prediction (WAIP) modes (606, 707).

In VVC Draft 2, a size of an MPM list is still 3 and the MPM list generation process is the same as HEVC. However, a difference is that "offset" is changed to 61 and "mod" is changed to 64 since there are 67 signaled modes in VVC Draft 2.

The following clause from VVC draft 2 describes luma intra mode coding process, wherein IntraPredModeY[xPb][yPb] is derived:
1. The neighbouring locations (xNbA, yNbA) and (xNbB, yNbB) are set equal to (xPb−1, yPb) and (xPb, yPb−1), respectively.

2. For X being replaced by either A or B, the variables candIntraPredModeX are derived as follows:

The availability derivation process for a block as specified in clause 6.4.X [Ed. (BB): Neighbouring blocks availability checking process tbd] is invoked with the location (xCurr, yCurr) set equal to (xPb, yPb) and the neighbouring location (xNbY, yNbY) set equal to (xNbX, yNbX) as inputs, and the output is assigned to availableX.

The candidate intra prediction mode candIntraPredModeX is derived as follows:

If one or more of the following conditions are true, candIntraPredModeX is set equal to INTRA_DC.
  The variable availableX is equal to FALSE.
  CuPredMode[xNbX] [yNbX] is not equal to MODE INTRA.
  X is equal to B and yPb−1 is less than ((yPb>>CtbLog2SizeY)>>CtbLog2SizeY).

Otherwise, candIntraPredModeX is set equal to IntraPredModeY[xNbX] [yNbX].

3. The candModeList[x] with x=0 . . . 2 is derived as follows:

If candIntraPredModeB is equal to candIntraPredModeA, the following applies:

If candIntraPredModeA is less than 2 (i.e., equal to INTRA PLANAR or INTRA_DC), candModeList[x] with x=0 . . . 2 is derived as follows:

candModeList[0]=INTRA_PLANAR (8-1)

candModeList[1]=INTRA_DC (8-2)

candModeList[2]=INTRA_ANGULAR50 (8-3)

Otherwise, candModeList[x] with x=0 . . . 2 is derived as follows:

candModeList[0]=candIntraPredMode$A$ (8-4)

candModeList[1]=2+((candIntraPredMode$A$+61)%64) (8-5)

candModeList[2]=2+((candIntraPredMode$A$−1)%64) (8-6)

Otherwise (candIntraPredModeB is not equal to candIntraPredModeA), the following applies:
candModeList[0] and candModeList[1] are derived as follows:

candModeList[0]=candIntraPredMode$A$ (8-7)

candModeList[1]=candIntraPredMode$B$ (8-8)

If neither of candModeList[0] and candModeList[1] is equal to INTRA_PLANAR, candModeList[2] is set equal to INTRA_PLANAR,
Otherwise, if neither of candModeList[0] and candModeList[1] is equal to INTRA_DC, candModeList[2] is set equal to INTRA_DC,
Otherwise, candModeList[2] is set equal to INTRA_ANGULAR50.

4. IntraPredModeY[xPb] [yPb] is derived by applying the following procedure:
If intra_luma_mpm_flag[xPb] [yPb] is equal to 1, the IntraPredModeY[xPb] [yPb] is set equal to candModeList[intra_luma_mpm_idx[xPb] [yPb]].

Otherwise, IntraPredModeY[xPb] [yPb] is derived by applying the following ordered steps:

1. The array candModeList[x], x=0 . . . 2 is modified by the following ordered steps:
  i. When candModeList[0] is greater than candModeList[1], both values are swapped as follows:

(candModeList[0],candModeList[1])=Swap(candModeList[0],candModeList[1]) (8-9)

ii. When candModeList[0] is greater than candModeList[2], both values are swapped as follows:

(candModeList[0],candModeList[2])=Swap(candModeList[0],candModeList[2]) (8-10)

iii. When candModeList[1] is greater than candModeList[2], both values are swapped as follows:

(candModeList[1],candModeList[2])=Swap(candModeList[1],candModeList[2]) (8-11)

2. IntraPredModeY[xPb] [yPb] is derived by the following ordered steps:
  i. IntraPredModeY[xPb] [yPb] is set equal to intra_luma_mpm_remainder[xPb] [yPb].
  ii. For i equal to 0 to 2, inclusive, when IntraPredModeY[xPb] [yPb] is greater than or equal to candModeList[i], the value of IntraPredModeY[xPb] [yPb] is incremented by one.

In the above, variable IntraPredModeY[x] [y] with x=xPb . . . xPb+cbWidth−1 and y=yPb . . . yPb+cbHeight−1 is set to be equal to IntraPredModeY[xPb] [yPb].

In the development of VVC Draft 2, an MPM list with size of 6 was proposed. Planar and DC modes are included in the MPM list. Two neighboring modes, left and above modes, are used to generate the remaining 4 MPMs.

Figure 7:
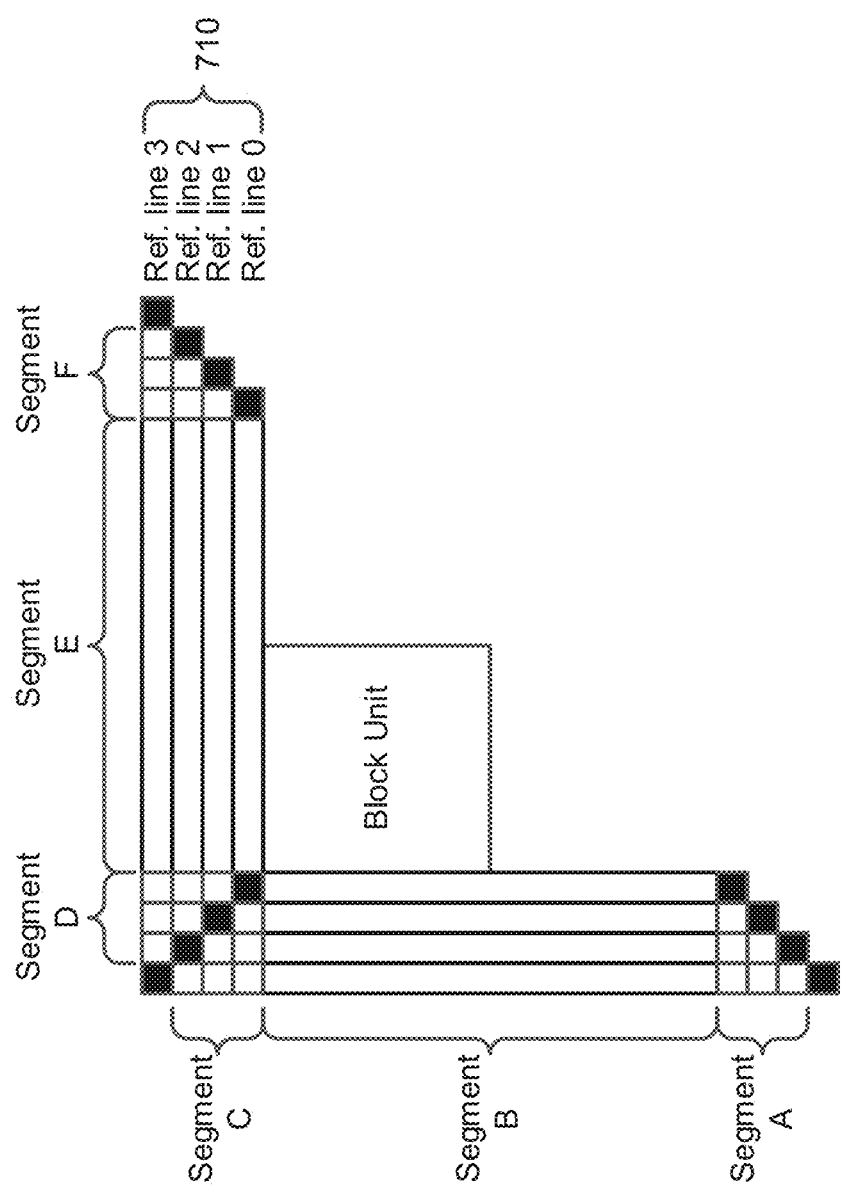
FIG. 7 is a diagram illustrating an example of reference lines for multi-line intra prediction.

Multi-line intra prediction was proposed to use more reference lines for intra prediction, wherein the encoder decides and signals which reference line is used to generate the intra predictor. A reference line index is signaled before intra prediction modes, and Planar/DC modes are excluded from intra prediction modes in case a nonzero reference line index is signaled. In FIG. 7, an example of 4 reference lines (710) is depicted, where each reference line (710) is composed of six segments, i.e., Segment A to F, together with the top-left reference sample. In addition, Segment A and F are padded with the closest samples from Segment B and E, respectively.

In multi-line intra prediction, Planar and DC modes are excluded from the MPM list generation and mode coding when the signaled reference line index is non-zero. In addition, it was proposed that MPM list with a size 6 can be generated by 2 neighboring modes. Therefore, it is an open question on how to generate 6 angular MPMs for non-zero lines when only 2 neighboring modes can be accessed.

The proposed methods may be used separately or combined in any order.

In the description below, the line index of the nearest reference line is 0 (zero reference line). The maximum signaled reference line number is denoted as N.

Figure 8:
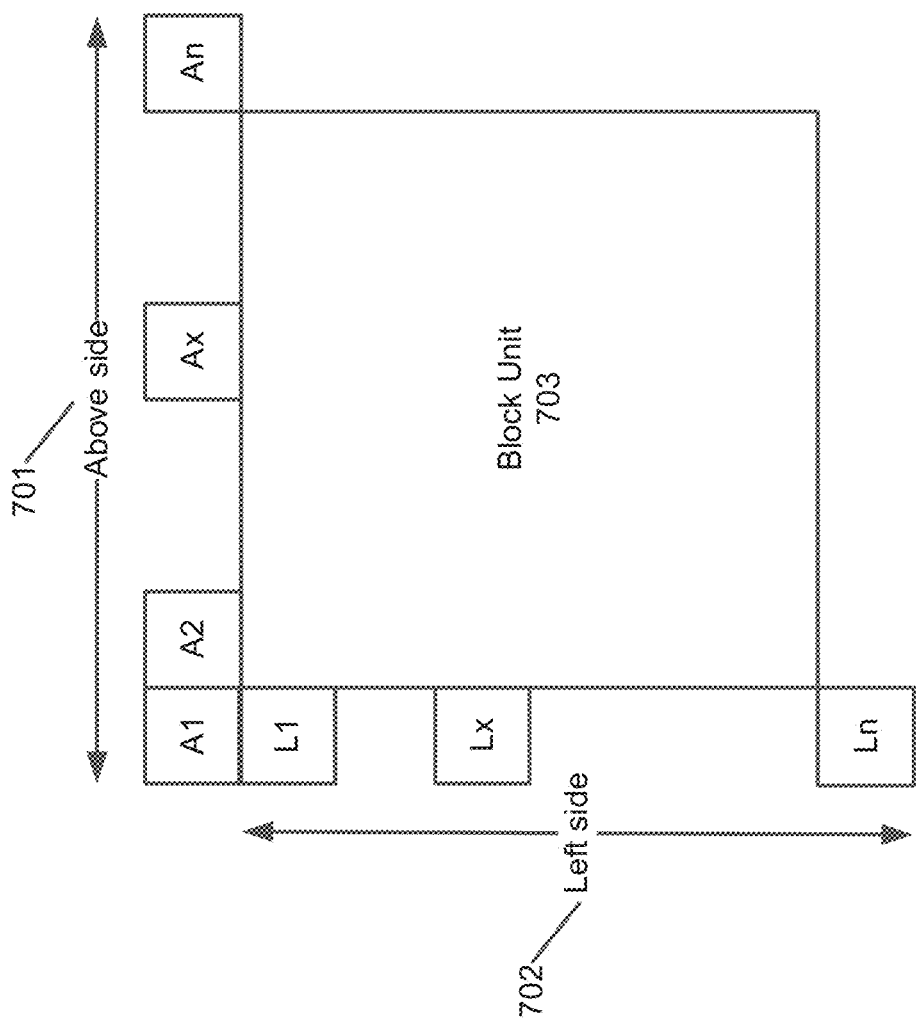
FIG. 8 is a diagram illustrating an example of top-side and left-side blocks with respect to a current block.

The above(top)-side (701) and left-side blocks (702) are defined as follows, as also illustrated in FIG. 8:

The pixel in the top-left position within current block (703) is denoted as (x,y), as shown in FIG. 8. A block with all included samples' y-coordinates being larger than or equal to y and all included samples' x-coordinate being smaller than x is called a left-side block. A block with all included samples' y-coordinates being smaller than y is called an above-side block. One example of the left-side blocks (L1, Lx and Ln) and above-side blocks (A1, A2, Ax, An) of current block (703) is shown in FIG. 8.

The two neighboring modes referred below can be from an above side (701) of the current block (703) or from a left side (702) of the current block (703). Some examples of the two neighboring modes are as follows:

In one example, both two neighboring modes are from the left side (702).

In another example, both two neighboring modes are from the above side (701).

In another example, one of the neighboring modes is from the left side (702) and another neighboring mode is from the above side (701).

In another example, two neighboring modes are both from the above side (701) when a width of current block (703) is larger than a height of the current block (703), or two neighboring modes are both from the left side (702) when the height is larger than the width, or one neighboring mode is from the above side (701) and another neighboring mode is from the left side (702) when the width is equal to the height.

The reference sample sides (as described in the above examples) may be selected and used to derive two (or more) neighboring blocks according to the block width, block height, block width versus height ratio.

In one example, if the block width/height is larger than a pre-defined threshold, then the two (or more) neighboring blocks are selected from only the above side (701). Example values of the threshold include, but are not limited to, 2, 4, 8, 16, 32, and 64.

In another example, if the block height/width is larger than a pre-defined threshold, then the two (or more) neighboring blocks are selected from only the left side (702). Example values of the threshold include, but are not limited to 2, 4, 8, 16, 32, and 64.

In the description below, if the mode of the neighboring block is not available, that mode will be set to Planar or DC mode.

In the description below, if the signaled mode number range is 0~M (0 and M are included), M can be any positive integer, such as 34 or 66. The adjacent modes of a given mode X is defined as: if X is larger than 2 and less than M−1, the adjacent modes of X is X−1 and X+1. If X is equal to 2, the adjacent modes of X is 3 and M (or M−1). If X is equal to M−1, the adjacent modes of X is X−1 and X+1 (or 2). If X is equal to M, the adjacent modes of X is M−1 and 2 (or 3).

In the description below, if one mode is not Planar or DC mode, or one mode is generating prediction samples according a given prediction direction, such as intra prediction modes 2~66 as defined in VVC draft 2, the one mode is called an angular mode. Two variables, offset and mod, can have the following two sets:

1) Offset=mod−3, mod=M−2;
2) Offset=mod−3, mod=M−1;

The following methods may generate 6 angular MPMs via two neighboring modes when the signaled reference line index is non-zero. The following methods or example can be used separately or combined in any order.

In one embodiment, if at least one of the two neighboring modes is an angular mode, the following algorithm is used to generate 6 angular MPMs. Two neighboring modes are denoted as Mode_A and Mode_B. Variable ang_mode[ ] is used to record angular modes of neighboring modes. Variable ang_count is used to indicate the number of angular modes, and mpm_index is used to indicate the index of the MPM list. Initially, ang_count and mpm_index are set to 0. IncludedMode[ ] is used to indicate whether each mode is included in the MPM list, and all elements in array IncludedMode[ ] is initially set to false.

If Mode_A is angular mode, MPM [mpm_index]=Mode_A, ang_count+=1, mpm_index+=1;
If Mode_B is angular mode, MPM [mpm_index]= Mode_B, ang_count+=1, mpm_index+=1;
For (diff=0; diff<=2 && mpm_index<6; diff++) {
For (idx=0; idx<ang_count; idx++) {
MPM[mpm_index]=((ang_mode[idx]+offset−diff) % mod)+2;
If (includedMode[MPM[mpm_index]]==false){ includedMode[MPM[mpm_index++]]=true}
if mpm_index==6, break;
MPM[mpm_index]=((ang_mode[idx]−1+% mod)+2;
If (includedMode[MPM[mpm_index]] false){ includedMode[MPM[mpm_index++]]=true}

In one embodiment, if only one of the neighboring modes is an angular mode, which is denoted as ang_neighbor, then ang_neighbor and its 2 adjacent modes (denoted as mode_L and mode_R) are added into the MPM list, and then one adjacent mode of mode_L and one adjacent mode of mode_R are added into the MPM list. Finally, a Vertical/Horizontal mode is added to generate the 6 angular MPMs. These 6 angular modes can be added into the MPM list in any order.

In one example, 6 angular MPMs is generated as follows.
MPM[0]=ang_mode
MPM[1]=((ang_mode+offset) % mod)+2;
MPM[2]=((ang_mode−1) % mod)+2;
MPM[3]=((ang_mode−1+offset) % mod)+2;
MPM[4]=((ang_mode) % mod)+2;
MPM[5]=Vertical or Horizontal mode. In one example, if vertical mode is not included in MPM[0]~MPM[4], MPM[5] is set to vertical mode. Otherwise, MPM[5] is set to Horizontal mode In another embodiment, if only one of the neighboring modes is an angular mode, which is denoted as ang_neighbor, then ang_neighbor and its 2 adjacent modes (denoted as mode_L and mode_R) are added into the MPM list, and then one adjacent mode of mode_L (denoted as mode_L_L) and one adjacent mode of mode_R (denoted as mode_R_R) are added into the MPM list. Finally, one adjacent mode of mode_L_L or mode_R_R is added into the MPM list. These 6 angular modes can be added into the MPM list in any order.

In one example, 6 angular MPMs are generated as follows.
MPM[0]=ang_mode
MPM[1]=((ang_mode+offset) % mod)+2;
MPM[2]=((ang_mode−1) % mod)+2;
MPM[3]=((ang_mode−1+offset) % mod)+2;
MPM[4]=((ang_mode) % mod)+2;
MPM[5]=((ang_mode+1) % mod)+2;

In another example, 6 angular MPMs are generated as follows.
MPM[0]=ang_mode
MPM[1]=((ang_mode+offset) % mod)+2;
MPM[2]=((ang_mode−1) % mod)+2;
MPM[3]=((ang_mode−1+offset) % mod)+2;
MPM[4]=((ang_mode) % mod)+2;
MPM[5]=((ang_mode−2+offset) % mod)+2;

In another embodiment, if only one of the neighboring modes is an angular mode, which is denoted as ang_neighbor, then 6 angular MPMs are derived as follows, wherein the 6 angular modes can be added into the MPM list in any order. One example is shown below.
- MPM[0]=ang_mode
- MPM[1]=((ang_mode+offset) % mod)+2;
- MPM[2]=((ang_mode−1) % mod)+2;
- MPM[3]=((ang_mode−2+offset) % mod)+2;
- MPM[4]=((ang_mode+1) % mod)+2;
- MPM[5]=Vertical or Horizontal mode. In one example, if vertical mode is not included in MPM[0] MPM[4], MPM[5] is set to vertical mode. Otherwise, MPM[5] is set to Horizontal mode In another embodiment, if two of the neighboring modes are angular modes, and they are adjacent modes, then the MPM list may be generated as follows. The two neighboring modes are denoted as Mode_A and Mode_B and they are added into the MPM list. Variable ang_max and ang_min is used to record the max mode and min mode between Mode_A and Mode_B.
- If Mode_A is larger than Mode_B, ang_max is set to Mode_A and ang_min is set to Mode_B
- If ang_min is equal to 2 and ang_max is equal to M−1 or M, the value of ang_min and ang_max is switched.
- The remaining 4 angular MPM are derived as follows. These 4 modes can be added in any order, the followings is one example.
  - MPM [2]=((ang_min+offset) % mod)+2;
  - MPM [3]=((ang_max−1) % mod)+2;
  - MPM [4]=((ang_min−1+offset) % mod)+2;
  - MPM [5]=((ang_max) % mod)+2;

In another embodiment, two neighboring modes are denoted by Mode_A and Mode_B, and if both of the two neighboring modes are angular modes, and abs(Mode_A−Mode_B)>2 && abs(Mode_A−Mode_B)<=Thres, the following algorithm is used to generate 6 angular MPMs. Thres is a positive integer and Thres is larger than 2, for example Thres=61 or 62 or 63.
- Firstly, Mode_A and Mode_B is added into the MPM list
- Then, 2 adjacent modes of Mode_A and 2 adjacent modes of Mode_B are also added into the MPM list
- And these 6 angular MPMs can be added into the MPM list in any order
- An example of the generation of 6 MPM is shown below
  - MPM [0]=Mode_A
  - MPM [1]=Mode_B
  - MPM [2]=((Mode_A+offset) % mod)+2;
  - MPM [3]=((Mode_A−1) % mod)+2;
  - MPM [4]=((Mode_B+offset) % mod)+2;
  - MPM [5]=((Mode_B−1) % mod)+2;

In another embodiment, two neighboring modes are denoted by Mode_A and Mode_B, and if both of the two neighboring modes are angular modes, and abs(Mode_A−Mode_B)==2||abs(Mode_A−Mode_B)>Thres, wherein Thres is a positive integer and Thres is larger than 2, for example Thres=61 or 62 or 63, 6 angular MPMs are derived by the following algorithm.
- Variable ang_max and ang_min is used to record the max mode and min mode between Mode_A and Mode_B.
- If Mode_A is larger than Mode_B, ang_max is set to Mode_A and ang_min is set to Mode_B
- Then 3 adjacent modes of Mode_A and Mode_B are added into the MPM list
- Finally, Vertical or horizontal mode is added into the MPM list and these 6 MPM can be added into the MPM list in any order.
- One example is shown as follows
  - MPM[0]=ang_min
  - MPM[1]=ang_max
  - MPM[2]=((ang_min−1) % mod)+2;
  - MPM[3]=((ang_min+offset) % mod)+2;
  - MPM[4]=((ang_max−1) % mod)+2;
  - MPM[5]=Vertical or Horizontal mode. In one example, if vertical mode is not included in MPM[0] MPM[4], MPM[5] is set to vertical mode. Otherwise, MPM[5] is set to Horizontal mode In another embodiment, if both of the two neighboring modes are Planar or DC modes, 6 default modes are used to fill the MPM list. The 6 default modes can be added into the MPM list in any order.
- In one embodiment, 6 default modes are {50, 18, 2, 34, 66, 26}
- In anther embodiment, 6 default modes are {50, 18, 2, 34, 26, 42}
- In another embodiment, 6 default modes are {50, 18, 34, 66, 42, 58} when width of current block is larger than height
- In another embodiment, 6 default modes are {50, 18, 34, 2, 10, 26} when height of current block is larger than width
- In another embodiment, 6 default modes are {50, 18, 2, 34, 26, 42} when width of current block is equal to height In another embodiment, all the neighboring modes which are angular modes are first added into the MPM list. Then, for each of the neighboring modes which is an angular mode, denoted as ang_mode, an angular mode ((ang_mode−1) % mod)+2 and an angular mode ((ang_mode+offset) % mod)+2 are added to the MPM list if not already included.
- In one embodiment, if the MPM list is still not fully filled, then several default modes are added. The default mode list can be any of the alternatives described in above bullet h.
- In another embodiment, if the MPM list is still not fully filled, then for each of the mode already in the MPM list, denoted as mpm_mode, an angular mode ((mpm_mode−1)% mod)+2 and an angular mode ((mpm_mode+offset) % mod)+2 are added to the MPM list if not already included.

The techniques described above can be, in at least one embodiment, performed by an integrated circuit, a series of integrated circuits, and/or other electronic circuitry. The techniques can be, in at least one embodiment, partially or entirely embodied in software running on one or more CPUs with associated memories.

The techniques, described above, can be implemented as computer software using computer-readable instructions and physically stored in one or more computer-readable media. For example, FIG. 9 shows a computer system (800) suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove, joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data glove, or joystick (805), but there can also be tactile feedback devices that do not serve as input devices). For example, such devices may be audio output devices (such as: speakers (809), headphones (not depicted)), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks 844, and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can be also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A video decoding method performed by at least one processor to control multi-line intra prediction using a non-zero reference line, the method comprising:
    determining whether an intra prediction mode of a first neighboring block of a current block is an angular mode;
    determining whether an intra prediction mode of a second neighboring block of the current block is an angular mode; and
    generating a Most Probable Mode (MPM) list for intra prediction of the current block, wherein the generating comprises:
        determining the intra prediction mode of the first neighboring block is an angular mode and the intra prediction mode of the second neighboring block is not an angular mode;
        including in the MPM list, based on the determining, the intra prediction mode of the first neighboring block, a left adjacent angular mode of the intra prediction mode of the first neighboring block, a right adjacent angular mode of the intra prediction mode of the first neighboring block, an adjacent angular mode of the left adjacent angular mode other than the intra prediction mode of the first neighboring block, an adjacent angular mode of the right adjacent angular mode other than the intra prediction mode of the first neighboring block, and an additional adjacent angular mode that is adjacent to the adjacent angular mode of the left adjacent angular mode other than the left adjacent angular mode or that is adjacent to the adjacent angular mode of the right adjacent angular mode other than the right adjacent angular mode,
    wherein the additional adjacent angular mode is adjacent, in a direction, to one angular mode from among the adjacent angular mode of the left adjacent angular mode and the adjacent angular mode of the right adjacent angular mode such that there is no intervening angular mode between the additional adjacent angular mode and the one angular mode in the direction.

2. The video decoding method of claim 1, wherein the including comprises:
    setting a first candidate mode of the MPM list to the intra prediction mode of the first neighboring block;
    setting a second candidate mode of the MPM list to the left adjacent angular mode of the intra prediction mode of the first neighboring block;
    setting a third candidate mode of the MPM list to the right adjacent angular mode of the intra prediction mode of the first neighboring block;
    setting a fourth candidate mode of the MPM list to the adjacent angular mode of the left adjacent angular mode other than the intra prediction mode of the first neighboring block; and
    setting a fifth candidate mode of the MPM list to the adjacent angular mode of the right adjacent angular mode other than the intra prediction mode of the first neighboring block.

3. The video decoding method of claim 2, wherein the including further comprises setting a sixth candidate mode of the MPM list to the additional adjacent angular mode.

4. The video decoding method of claim 3, wherein the MPM list consists of the first candidate mode, the second candidate mode, the third candidate mode, the fourth candidate mode, the fifth candidate mode, and the sixth candidate mode.

5. The video decoding method of claim 2, wherein the MPM list is generated such that an order of most probable candidate modes in an index of the MPM list is, from lowest to higher within the index, the first candidate mode to the fifth candidate mode.

6. The video decoding method of claim 3, wherein the MPM list is generated such that an order of most probable candidate modes in an index of the MPM list is, from lowest to highest within the index, the first candidate mode to the sixth candidate mode.

7. The video decoding method of claim 4, wherein the MPM list is generated such that an order of most probable candidate modes in an index of the MPM list is, from lowest to highest within the index, the first candidate mode to the sixth candidate mode.

8. The video decoding method of claim 1, wherein the additional adjacent angular mode is adjacent to the adjacent angular mode of the left adjacent angular mode.

9. The video decoding method of claim 1, wherein the additional adjacent angular mode is adjacent to the adjacent angular mode of the right adjacent angular mode.

10. The video decoding method of claim 1, where the MPM list is generated to consist of six candidate modes that are angular modes.

11. A device for controlling multi-line intra prediction using a non-zero reference line for decoding a video sequence, the device comprising:
    at least one memory configured to store computer program code; and
    at least one processor configured to access the at least one memory and operate according to the computer program code, the computer program code comprising:
        first determining code configured to cause the at least one processor to determine whether an intra prediction mode of a first neighboring block of a current block is an angular mode;
        second determining code configured to cause the at least one processor to determine whether an intra prediction mode of a second neighboring block of the current block is an angular mode; and
        generating code configured to cause the at least one processor to generate a Most Probable Mode (MPM) list for intra prediction of the current block, wherein the generating code comprises code configured to cause the at least one processor to:
include in the MPM list, based on determining the intra prediction mode of the first neighboring block is an angular mode and the intra prediction mode of the second neighboring block is not an angular mode, the intra prediction mode of the first neighboring block, a left adjacent angular mode of the intra prediction mode of the first neighboring block, a right adjacent angular mode of the intra prediction mode of the first neighboring block, an adjacent angular mode of the left adjacent angular mode other than the intra prediction mode of the first neighboring block, an adjacent angular mode of the right adjacent angular mode other than the intra prediction mode of the first neighboring block, and an additional adjacent angular mode that is adjacent to the adjacent angular mode of the left adjacent angular mode other than the left adjacent angular mode or that is adjacent to the adjacent angular mode of the right adjacent angular mode other than the right adjacent angular mode, wherein the additional adjacent angular mode is adjacent, in a direction, to one angular mode from among the adjacent angular mode of the left adjacent angular mode and the adjacent angular mode of the right adjacent angular mode such that there is no intervening angular mode between the additional adjacent angular mode and the one angular mode in the direction.

12. The device of claim 11, wherein
the code of the generating code is configured to cause the at least one processor to:
set a first candidate mode of the MPM list to the intra prediction mode of the first neighboring block;
set a second candidate mode of the MPM list to the left adjacent angular mode of the intra prediction mode of the first neighboring block;
set a third candidate mode of the MPM list to the right adjacent angular mode of the intra prediction mode of the first neighboring block;
set a fourth candidate mode of the MPM list to the adjacent angular mode of the left adjacent angular mode other than the intra prediction mode of the first neighboring block; and
set a fifth candidate mode of the MPM list to the adjacent angular mode of the right adjacent angular mode other than the intra prediction mode of the first neighboring block.

13. The device of claim 12, wherein
the code of the generating code is further configured to cause the at least one processor to set a sixth candidate mode of the MPM list to the additional adjacent angular mode.

14. The device of claim 13, wherein
the MPM list consists of the first candidate mode, the second candidate mode, the third candidate mode, the fourth candidate mode, the fifth candidate mode, and the sixth candidate mode.

15. The device of claim 12, wherein
the generating code is configured to generate the MPM list such that an order of most probable candidate modes in an index of the MPM list is, from lowest to higher within the index, the first candidate mode to the fifth candidate mode.

16. The device of claim 13, wherein
the generating code is configured to generate the MPM list such that an order of most probable candidate modes in an index of the MPM list is, from lowest to highest within the index, the first candidate mode to the sixth candidate mode.

17. The device of claim 14, wherein
the generating code is configured to generate the MPM list such that an order of most probable candidate modes in an index of the MPM list is, from lowest to highest within the index, the first candidate mode to the sixth candidate mode.

18. The device of claim 11, wherein the additional adjacent angular mode is adjacent to the adjacent angular mode of the left adjacent angular mode.

19. The device of claim 11, wherein the additional adjacent angular mode is adjacent to the adjacent angular mode of the right adjacent angular mode.

20. A non-transitory computer-readable storage medium storing instructions that cause at least one processor to:
determine whether an intra prediction mode of a first neighboring block of a current block is an angular mode;
determine whether an intra prediction mode of a second neighboring block of the current block is an angular mode; and
generate a Most Probable Mode (MPM) list for intra prediction of the current block, wherein the generating comprises:
determining the intra prediction mode of the first neighboring block is an angular mode and the intra prediction mode of the second neighboring block is not an angular mode;
including in the MPM list, based on the determining, the intra prediction mode of the first neighboring block, a left adjacent angular mode of the intra prediction mode of the first neighboring block, a right adjacent angular mode of the intra prediction mode of the first neighboring block, an adjacent angular mode of the left adjacent angular mode other than the intra prediction mode of the first neighboring block, an adjacent angular mode of the right adjacent angular mode other than the intra prediction mode of the first neighboring block, and an additional adjacent angular mode that is adjacent to the adjacent angular mode of the left adjacent angular mode other than the left adjacent angular mode or that is adjacent to the adjacent angular mode of the right adjacent angular mode other than the right adjacent angular mode, wherein the additional adjacent angular mode is adjacent, in a direction, to one angular mode from among the adjacent angular mode of the left adjacent angular mode and the adjacent angular mode of the right adjacent angular mode such that there is no intervening angular mode between the additional adjacent angular mode and the one angular mode in the direction.

* * * * *